United States Patent [19]

Karnik

[11] Patent Number: 5,404,294
[45] Date of Patent: Apr. 4, 1995

[54] TAG METHOD FOR MOVING INFORMATION BETWEEN COMPUTERS & FORMS

[76] Inventor: Jayant D. Karnik, P.O. Box 741, Tallahassee, Fla. 32302-0741

[21] Appl. No.: 484,502

[22] Filed: Feb. 26, 1990

[51] Int. Cl.⁶ .............................................. G06F 15/40
[52] U.S. Cl. .................... 364/419.1; 345/149
[58] Field of Search ............... 364/419, 200, 900, 149, 364/419.1–419.13; 395/144–149

[56] References Cited

U.S. PATENT DOCUMENTS

| | | | |
|---|---|---|---|
| 3,872,462 | 3/1975 | Lemelson | 340/734 |
| 4,553,206 | 11/1985 | Smutek | 364/300 |
| 4,763,356 | 8/1988 | Day, Jr. et al. | 364/900 |
| 4,900,941 | 2/1990 | Barton et al. | 235/462 |
| 4,937,439 | 6/1990 | Wanninger et al. | 235/470 |
| 5,004,896 | 4/1991 | Serrell et al. | 235/437 |
| 5,208,906 | 5/1993 | Morgan | 395/148 |

OTHER PUBLICATIONS

"Using Microsoft Word", Chapter 18 pp. 359–385.

*Primary Examiner*—Gail O. Hayes
*Assistant Examiner*—Stephen Tkacs

[57] ABSTRACT

A novel method comprising of a combination of steps by which: information from any computer database can be retrieved and placed at precise positions on a pre-printed form; information from a pre-filled form can be extracted and displayed or stored in a database.

3 Claims, 5 Drawing Sheets

| | |
|---|---|
| NAME | 1 |
| DESCRIPTION | 2 |
| EXTERNAL | 3 |
| TYPE | 4 |
| LINK | 5 |
| MANUAL | 6 |
| JUSTIFY | 7 |

| | |
|---|---|
| LNAME | 1 |
| TAX PAYER'S LAST NAME | 2 |
| NAMES.TXT | 3 |
| ALPHA | 4 |
| NONE | 5 |
| NO | 6 |
| LEFT | 7 |

FIG.1

| NAME | 1 |
|---|---|
| DESCRIPTION | 2 |
| EXTERNAL | 3 |
| TYPE | 4 |
| LINK | 5 |
| MANUAL | 6 |
| JUSTIFY | 7 |

| LNAME | 1 |
|---|---|
| TAX PAYER'S LAST NAME | 2 |
| NAMES.TXT | 3 |
| ALPHA | 4 |
| NONE | 5 |
| NO | 6 |
| LEFT | 7 |

TAG METHOD FOR MOVING INFORMATION BETWEEN COMPUTERS & FORMS

BACKGROUND OF THE INVENTION

Every segment of modern society such as large corporations, government agencies, small businesses and also individuals constantly deal with large numbers of pre-printed forms to acquire information for their own use or to provide information to others. Most information on form type documents is permanent i.e. the information is pre-printed with blank fields for user entry.

In prior art information stored in computers is printed on forms by especially written computer programs that often require a technical individual (programmer) to create the desired computer programs. Any changes in the format of the pre-printed form requires rewriting of the computer program. This is often a tedious and time consuming process.

Prior art such as Microsoft Word provides a means for filling and printing on a pre-printed form. With Microsoft Word two documents are created separately, i.e. a Main document and a Data document. The Print Merge command is used to bring the varying information from the Data document into the Main document to create individualized copies of the form. The first paragraph in the Main document contains a DATA instruction. This instruction specifies the file name containing the data to be printed. The text of the main document contains field names which tell Microsoft Word what to print based on the contents of the fields. (Chapter 17, pgs 242-244 of the Microsoft Word manual explain the properties of field names.)

In prior art a method of extracting data from a pre-filled form does not exist.

OBJECTS OF THE INVENTION

It is an object of the invention to provide a simple and expedient method which can be used by a computer operator with very little experience, to fill in and also extract data from a pre-printed form.

Another object of the invention is to provide a means so that the operator is able to work on text or image data. Text data is generally alphanumeric or character based. Image data is represented as spatial co-ordinates or bit maps.

Another object of the invention is that an operator should be able to extract from or output to any type of a form type document, image or text data regardless of its format.

Another object of the invention is that an operator be able to work on the above type of data entered in the computer hardware from any input device such as a key board, digitizer, scanner, fax machine or a telecommunications device.

Another object of the invention is to be able to output the above type of data in a sequence defined by the operator to an output device such as a printer, telecommunications equipment, fax machine, plotter, database or the like.

Another object of the invention is to be able to extract the above type of data from a pre-filled form entered into a computer by an input device such as a scanner, fax machine, telecommunication equipment or the like.

Another object of the invention is to provide a means to be machine independent i.e it should function equally well on mainframe, mini and micro-computers.

Another object of the invention is that it should be operating system independent i.e it should be transparent to the operating system used by any computer.

Another object of the invention is that it should be language independent, i.e it should be transparent to the computer language used to implement the invention.

BRIEF SUMMARY OF THE INVENTION

A method to easily extract information stored in a database and placed at user specified positions on a pre-printed form or a form type document or the like and to extract information from a pre-filled form or a form type document or the like by means of user created Tags is disclosed. The information can be in text or image format.

DESCRIPTION OF THE INVENTION

Nomenclature And Definitions

In the following description, certain terms used frequently, have specialized meanings in the computer graphics field and are thus defined.

Tag

The term is frequently used in computer terminology and is familiar to those working in data processing. One such use of the word Tag is explained below.

Text data is stored in a standard format commonly known as ASCII. This format can be conveniently read by most computer programs commonly found in prior art. Image data poses a different problem. Images use up very large amounts of storage space, prior art uses various techniques to compress image data to conserve storage space. There are numerous compression techniques being used in the industry. Unlike text data a single standard does not exist for images. There are several standards in existence. Once such standard is the "Tag Image File Format" also known as TIFF. The word Tag is also used in other areas of data processing such as data bases. The word Tag used by the invention does not refer to "Tag Image File Format". The word Tag as used in the invention defines a record which contains a specific set of operations and functions stored as fields. These operations and functions point to the file which contains data, the type of data and any other operation that may have to be performed on the data after it is extracted from or stored in the data file. The Tag is dynamic, it is not restricted to a specific set of functions or operations. Anyone skilled in prior art could create a Tag with a unique set of properties and instructions. The Tag also acts as an identifier, name or key to the set of properties attached to it.

Pixels

The information which is used to create the screen display i.e to display an image is stored in a special section of computer memory, from where it is read by the hardware display device called the display adapter and converted directly to the display. Graphics images on a computer screen are composed of tiny dots called pixels for picture elements. Each pixel has a unique location in memory. Pixels are arranged on the screen in horizontal rows; there are a fixed number of rows and each row contains a certain number of pixels. The number of pixels used on a screen is called the "resolution".

There are various resolutions commonly used in the graphics field. The co-ordinates of the cursor or mouse on the screen can be represented by pixels. For example, in an x-y co-ordinate system, in pixel notation the point 0,0 is at the top left hand corner of the screen; the pixels along the x axis increase to the right; the pixels on the y axis increase downwards. A commonly used resolution is the EGA high resolution mode. In this mode there are 640 pixels along the x-axis and 350 along the y-axis. There are different types of hardware and methods available to scan or capture the image of a pre-printed form for display on a computer monitor. Therefore the image of a form displayed on the screen may not always represent the actual size of the form. It could be smaller or larger. Mathematical techniques for scaling an image are known to those skilled in graphics programming. The co-ordinates of any point on a form image displayed on a video display can be scaled to the co-ordinates of a point on the original form i.e any position on the form image can be accurately mapped to a position on the actual form.

Display Memory (Video Display Buffer)

The image to be displayed is stored in the display memory. Depending upon resolution one pixel may require one or more bits of display memory for storage.

Display Devices Throughout the description of the invention the terms video display, monitor or computer screen are used interchangeably to denote a device for displaying information in a computer.

Pointing Devices

Throughout the description of the invention the terms cursor, mouse or pointing device are used interchangeably to denote a device for accessing an area of a display device. Other devices such as a light pen can also be used as a pointing device.

Form Template

This is the image of a blank pre-printed form. The blank form is entered into the computer's display memory by a scanning device. The image is displayed and also stored permanently on a storage device such as a disk or diskette. In the invention Tags are entered on the form image.

Form File

Tags entered by the user on a particular form template and the co-ordinates of the Tag will be stored in a form file. The term form file is used frequently in the description that follows.

Data File

In the descriptions that follow the term data file refers to the file that contains data to be printed. When extracting information from a pre-filled form this file stores data that has been extracted.

Pre-Filled Form

As referenced in the invention a pre-filled form can be any paper or electronic form where the blank fields have been completed by different individuals either manually, electronically or mechanically.

Fill In The Blank

Pre-printed forms contain fixed information which is pre-printed and locations where variable information can be entered. The locations where variable information is entered is called "fill in the blanks" or blank field.

Entering Information

The invention scans a pre-printed blank form using any commercially available scanning device. The scanned image is stored as a template on a storage device such as a disk or diskette and also displayed on a computer monitor screen. By using the cursor or mouse the user can space to the exact position of a blank field on the form and enter the Tag at that position. (In Word this is analogous to field name and place marker). The position of the first letter of the tag marks the place where the information is to be printed. To display the image of the form on the monitor the computer has to be in a graphics mode. The image of the form is stored in the display memory of the computer, also known as video display buffer in prior art. When the cursor, mouse or a pointing device is moved on the screen it is moving over pixels, the present invention determines the number of pixels from the left edge of the form to the first letter of the Tag and the number of pixels from the top of the form to the first letter of the Tag. The exact location of the first letter of the Tag with respect to the left edge of the form and the exact location of the Tag from the top of the form are the X and Y co-ordinates of the Tag on the form, these co-ordinates are stored in pixel numbers along with the Tag in a separate form file. This file contains all the Tags and their respective co-ordinates specified by the user for the particular form. When the user is ready to fill the pre-printed form, the invention first sets the printer in graphics or incremental spacing mode. Every Tag in the form file is first accessed, the Tag points to the data file containing the information to be printed. The exact location (co-ordinates) of the Tag on the form is also retrieved from the form file, information to be printed is placed at this location.

Extracting Information

A blank pre-printed form is scanned into the computer. The scanned image is stored as a template on a storage device such as a disk or diskette and also displayed on a computer monitor screen. Tags are entered on the form image as explained above in "Entering Information". During extraction however, the cursor is positioned at the beginning of the field containing the information to be extracted and the Tag name is entered, the cursor is then moved to the end of the field, a function key such as F1 is pressed on the key board, at this point the invention knows the beginning and the ending positions of the field from the left edge of the form and also the position of the field from the top of the form, next the cursor is moved up vertically to indicate the height of the field. With the beginning, ending and the height, a rectangle enveloping the blank field on the form has been created. The Tag along with the co-ordinates (pixel positions) of the rectangle is stored in a form data file similar to the one explained in "Entering Information". After all the Tags have been entered for the particular form the invention is ready to extract information from a pre-filled form. The user first selects the extraction mode from the program menu, then a pre-filled form is scanned into the system. The form file for that particular form is first accessed this file contains all the Tags and the co-ordinates of the blank spaces on the form. The first Tag in the form file and the co-ordinates of the rectangle containing the blank space is accessed. From these co-ordinates the memory addresses in the display memory of the image in the rectangle are derived. The data in said memory address is retrieved. This is the data pointed to by the Tag and is the data entered by the individual who filled the pre-printed form. This data can now be be displayed or stored in the data file. This procedure is repeated for all the Tags in the form file.

It is not necessary to scan and extract information from pre-filled forms individually. Forms can be scanned in batches and the information extracted in batch mode.

These and other characteristics will be clearly apparent from the following descriptions with reference to the attached FIGS. 1–5 and an Internal Revenue Form 1040 which is used as an example, in which the objects of the invention are more particularly illustrated without however limiting it to the form of the embodiment illustrated therein.

DESCRIPTION OF FIGURES

FIG. 1 On the left hand side shows a header record in a Tag file and lists each field in the record. The header record is followed by the tag record. FIG. 1. On the right side shows an example of a Tag record. The field LNAME in the Tag record corresponds to the field NAME in the header record.

DETAILED DESCRIPTION OF FIGURES

Figure 1:
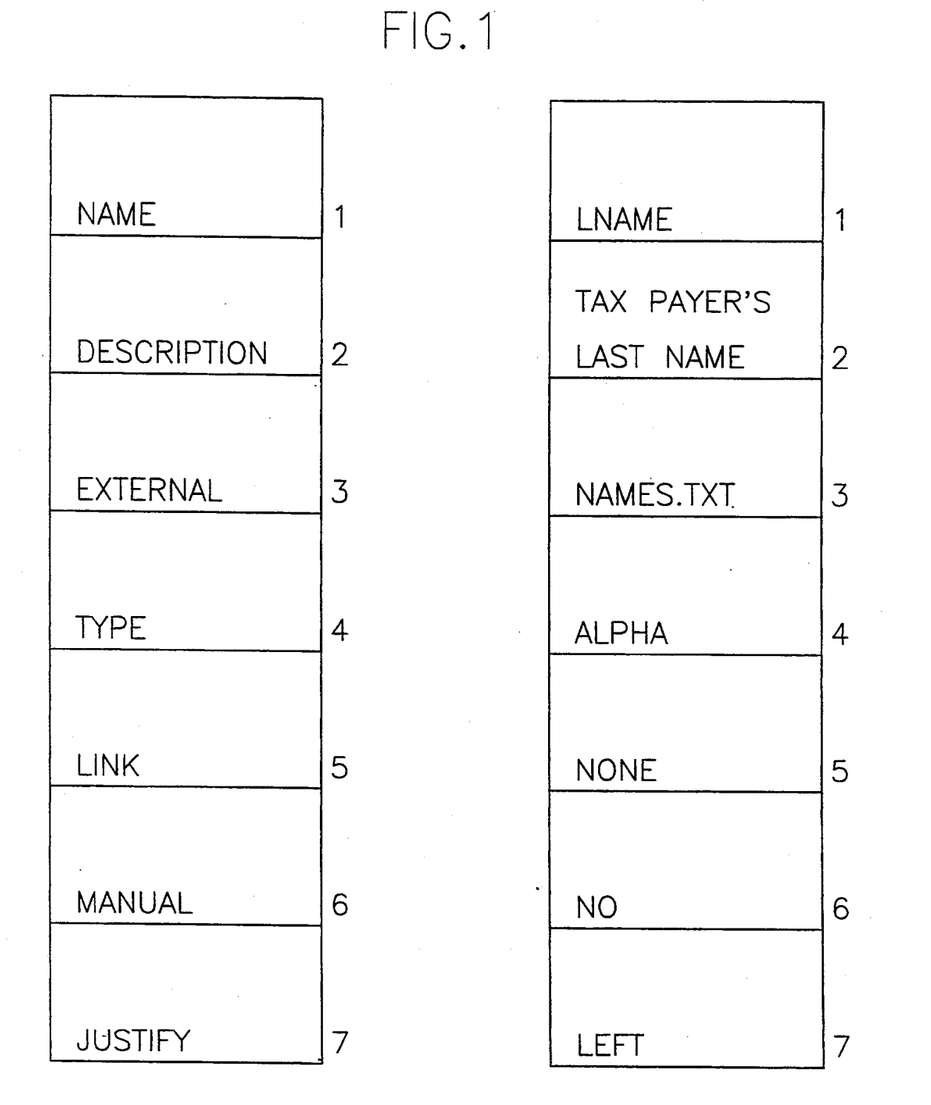

FIG. 1 Creating a data base of Tags

A Data Base containing Tags is first created. Every Tag is a record in the database and every Tag record has a set of specific properties and instructions which are executed when a Tag is read from a form file. These properties and instructions are stored as fields within the Tag record. Unlike Word, which uses a field to identify locations on the form where information is to be placed, the name field in the Tag record acts as a place marker, the name field also acts as a key to the database containing the Tag records. The instructions in the Tag are executed when a Tag is encountered in a form file.

Every Tag record has the following fields

1. NAME: This is an identification field. A Tag is always accessed by this field name.

2. DESCRIPTION: This field describes the Tag and its function e.g. a Tag LNAME created by ,one user may seem cryptic to another user. The description field for LNAME could mean "Last name of the tax payer."

3. EXTERNAL: This field contains the file name from which data is to be extracted. For example a Tag LNAME may use the file name "NAMES.TXT", this file could contain the names and addresses of all the tax payers. A Tag may use a file name "WAGES.TXT", this file may contain all the wages of all the tax payers in file "NAME.TXT".

4. TYPE: A Tag can access numeric integer, numeric floating, alphanumeric or graphic (bit map or spatial co-ordinates) data. This field specifies the type of data.

5. LINK: A Tag can be linked to other Tags arithmetically. For example A Tag "GROSS PROFIT" could be linked to other Tags which could be TOTAL-TAX-COST. When ever GROSS PROFIT is encountered the Tags TOTAL, TAX and COST are first located in the Tag data base and the .information in the data files pointed to by field EXTERNAL in these Tags is extracted and the arithmetic function TOTAL-TAX-COST is performed. Different types of mathematical functions can be specified.

6. MANUAL: If this field contains a "Y", the program will prompt for operator input.

7. JUSTIFY: This field is used to place the information left or right justified on the form. It can contain the characters L or R or the words Left or Right to specify justification.

Every record in the database has the above described fields in the same order, field number 3 in any record will refer to EXTERNAL and point to the file name stored in the record. The properties and instructions associated with a Tag are not limited to the seven listed above. If additional properties or instructions are required they can always be added as fields to the Tag record.

The invention is not restricted to using information stored in databases created by commercially available programs such as Lotus and DBASE. The user can create a database from any source with any type of data.

FIGS. 2 through 5. use the Internal Revenue Service's Form 1040 as an illustrative example. In the following descriptions the term Form 1040 will be interchangeably referred to as IRS 1040 and 1040. In FIGS. 2 through 5 a portion of the top block of form 1040 is illustrated. This block requires the tax payer's first name and initial, the last name, spouse's name and address. In the illustrations the tax payer's last name and its tag LNAME is used. The co-ordinates of the Tag LNAME in the illustration are with respect to the top left corner (X,Y) of the form as origin. Methods exist in prior art to transform the co-ordinates from the origin (X,Y) to the origin (0,0), which is the top left corner of the computer display screen.

Figure 2:
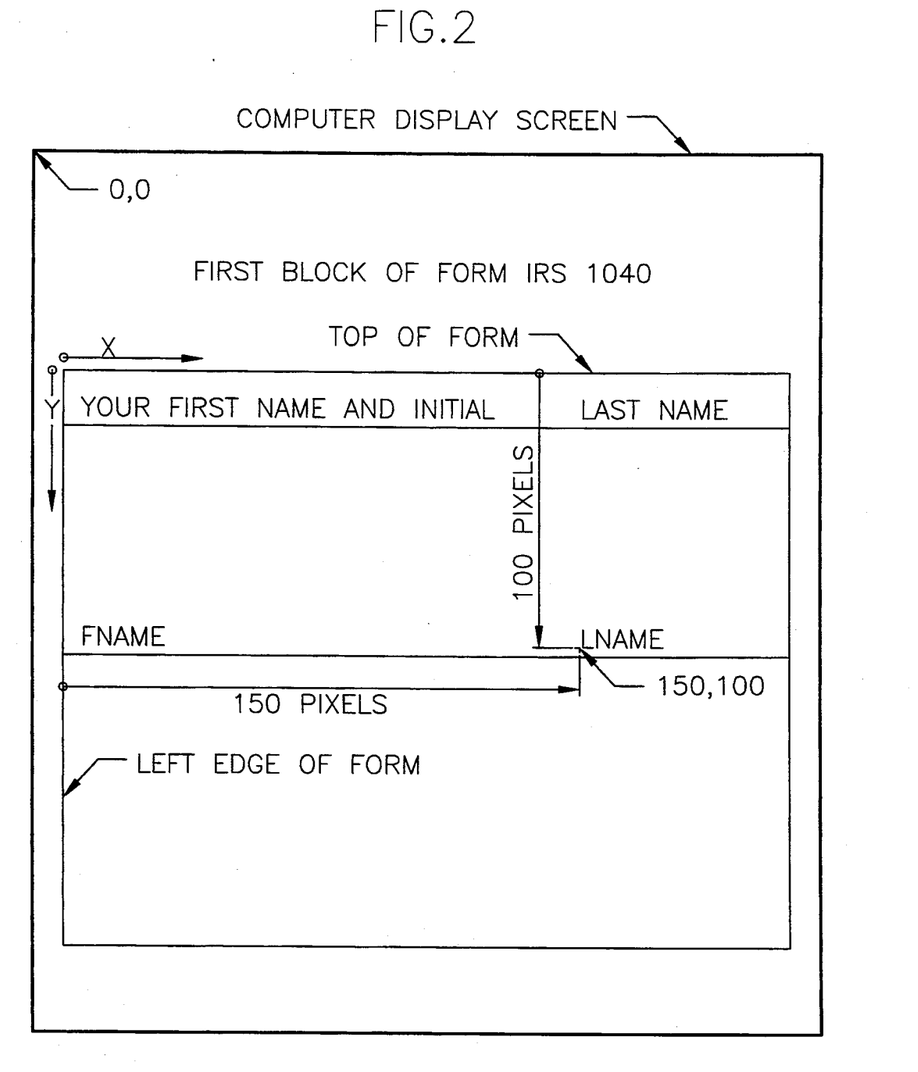
FIG. 2 Illustrates a partial image of an I.R.S.Form 1040, showing coordinates of the Tag "LNAME".

FIG. 2 Creation Of A Form File For Entering Information On A Pre-printed Form The user enters a "form create mode". The computer system at this point creates a form file under a name provided, by the user in this case IRS 1040. A blank form (IRS 1040) is then scanned into the computer by any scanning or digitizing device. The scanned form is stored as a template and also displayed on the monitor screen. FIG. 2 shows the image of the top portion of IRS form 1040. The cursor is positioned under the blank for the individual's last name and a Tag LNAME entered. The letter L in LNAME is 150 pixels from the left edge of the form and 100 pixels from the top of the form. The co-ordinates of the letter L are (150,100) with respect to the top left corner of the form image. The Tag and its position (co-ordinates) on the form are stored in the form file IRS 1040. Using the same procedure, Tags are positioned for all the blank fields on the form. The form file IRS 1040 and the template can also be transferred to other computers by storing it on any data storage medium or via remote communications or networks. The form file IRS 1040 can also be created at a remote site by using the above method.

Figure 3:
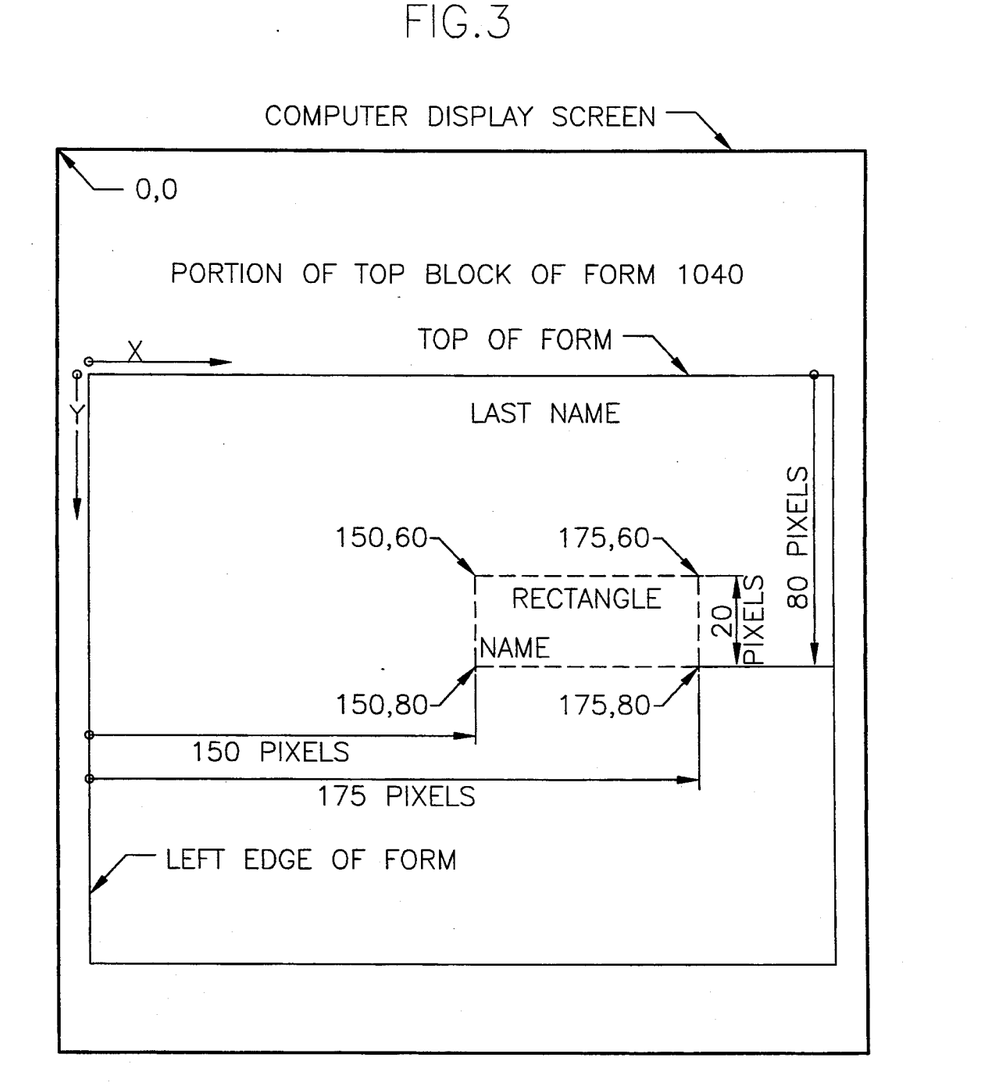
FIG. 3 Shows another partial image of an I.R.S. form 1040, showing pixel co-ordinates of the enveloping rectangle.

FIG. 3 Creation Of A Form File For Extracting Information From A Pre-filled Form A template for form 1040 is created as described in FIG. 2. The cursor, mouse or pointing device is positioned at the beginning of the blank for the taxpayer's last name. The Tag LNAME is entered at this position. The pointing device is then moved to the end of the blank for the tax payer's last name. The position of the letter L in LNAME is a 150 pixels from the left edge of the form and the end of the blank 175 pixels from the left edge of the form. The letter L is also 80 pixels from the top left edge of the form. The cursor is moved up vertically until it is high enough to envelope the information that would be filled in the blank field. In FIG. 3 the cursor has moved 20 pixels vertically. A rectangle with co-ordinates (150,60), (150,80), (175,80), (175,60) with respect to the top left corner of the form has been created. The Tag LNAME and the co-ordinates of the rectangle so created is stored in the form file. This process is repeated for all the the pre-filled blocks on the form 1040.

Figure 4:
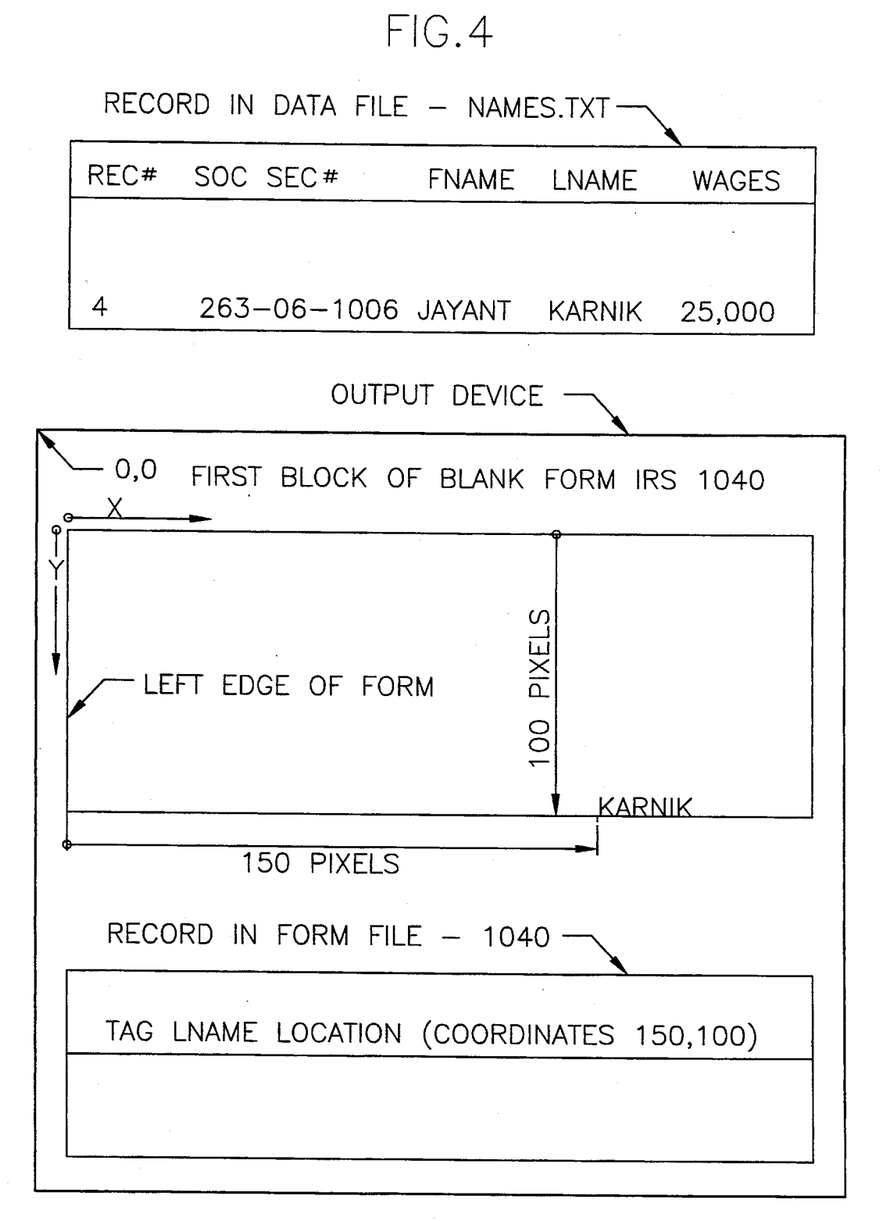
FIG. 4 Top rectangle shows an example of Data to be extracted from a data file NAMES.TXT. The second rectangle shows the Top portion of an I.R.S.form 1040 and the last Name KARNIK being placed at co-ordinates 150,100. The third rectangle shows where the Tag LNAME and its location 150,100 is stored in form file 1040.

FIG. 4 Outputting Information Stored In Databases To a Pre-printed Form Or Any Form Type Document To print a blank IRS 1040 form with a taxpayer's data the user (operator) enters the Print Form Mode. Next a blank form IRS 1040 is loaded on to the printer or output device or the like. The operator must now specify which tax payer's Form 1040 is to be printed. The operator can use one of the Tags created in FIG. 1. to locate the desired tax-payer and all the information associated with the tax-payer from the database mentioned in FIG. 1. In this example the tax-payer's social security number is used. The tax payer is Jayant Karnik, the social security number is 263-06-1006 and this information is in record number 4 of a file NAMES.TXT. The computer prompts the user for the taxpayer's social security number. The operator enters the number 263-06-1006. The invention then scans the data base created in FIG. 1, finds the Tag SOC-SEC. This Tag has the file name NAMES.TXT in the field External. The invention searches the file NAMES.TXT and at the location of the Tag SOC-SEC finds a match for the social security number 263-06-1006 in record number 4. The form file IRS 1040 created by FIG. 2. is then accessed. The records in the form file are read sequentially, the Tag LNAME and its position on the form is the second record. The invention now finds the Tag LNAME in the database of Tags. The source is NAMES.TXT in the field External. Record number 4 of the file NAMES.TXT is searched until the Tag LNAME is found this Tag has the name Karnik stored with it. Using the co-ordinates of the Tag LNAME provided by the form file IRS 1040, the invention now positions the output device at the same location on said blank form and outputs the word Karnik at that location. This process is repeated for all the Tags in the form file created in FIG. 2. The invention does not restrict the operator to outputting the tax payer information from the above described steps on to a pre-printed form such as the IRS 1040 or to printing devices. The information can also be merged with the image of a blank IRS 1040 form displayed on a display device. The information can be stored as a database on any computer storage device. The operator can also create customized output by specifying Tags and then displaying or printing information in any format from said database stored in the computer system to any output device. The operator could also devise a form on a monitor using a desk top publishing system and obtain the results described above. Further more the invention is not restricted to one Tag at a form location. Arithmetic expressions of several Tags can also be used.

Figure 5:
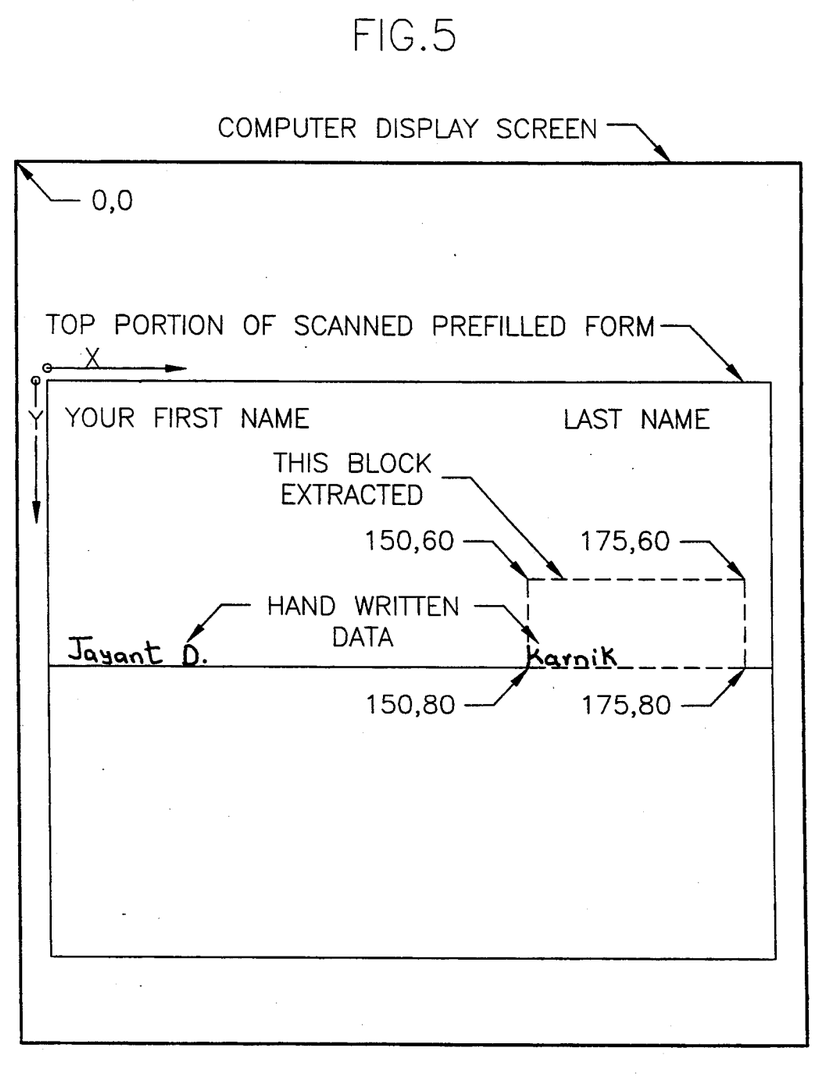
FIG. 5 Shows the top portion of a pre-filled form 1040, and shows the pixel co-ordinates of the rectangle enveloping the last name

FIG. 5. Extracting Information From A Pre-filled Form Or Any Form Type Document For Display Or Storage In A Database To extract information from a pre-filled IRS 1040 form the user (operator) first enters an Extract mode. A pre-filled form is scanned and stored in the video display buffer. In this example the tax payer is Jayant D. Karnik. The form was manually completed by Mr. Karnik. The scanned form therefore consists of text which is pre-printed and hand writing which was filled in by Mr. Karnik. The form file IRS 1040 is loaded into memory. The records in this file are accessed sequentially. The tag LNAME and the co-ordinates of the rectangle containing the block for last name are read. The co-ordinates of the rectangle are now mapped to the image of the scanned form which resides in video memory i.e. the co-ordinates of the rectangle give the memory locations containing the image of the hand written word Karnik. The data in these memory locations is the hand written word Karnik, it is retrieved and is ready for display, transmission or storage on any computer storage medium. The next Tag SOC-SEC is retrieved from the form file and the above described procedure is repeated until all Tags in the form file have been accessed. It is not necessary to scan and extract information from a pre-filled form individually. Forms can be scanned in batches and information extracted in batch mode.

By extracting data as described above in FIGS. 3 and 5 the present invention as contemplated, provides a means of compressing form image data for storage and transmission. A majority of form type documents consist of pre-printed data which is repetitious and blank fields which are filled by users. When pre-filled forms are stored in prior art, storage space is wasted because the repetitious pre-printed information is also stored with each form, the same is true for forms transmitted across computer systems. The present invention only extracts and stores data that changes from one form to another thus saving storage space. Methods described in FIGS. 2 and 4 can be used to reproduce (recreate) a pre-filled form by merging the extracted data with a blank form. When transmitting pre-filled forms between computers only the extracted data is transmitted from the host computer to the receiving computer. The pre-filled form is recreated at the receiving computer by merging the extracted data with the blank image of the form at the receiving computer using the methods described in FIGS. 2 and 4.

While the present invention has been particularly described with reference to FIGS. 1–5 and with emphasis on certain computer systems, it should be understood that the figures are for illustration only and should not be taken as limitations upon the invention. In addition, it is clear that the methods and apparatus of the present inventions have utility in any input/output device desired. It is contemplated that many changes and modifications may be made by some one of ordinary skill in the art without departing from the spirit and scope of the invention as disclosed above.

I claim:

1. A method of entering information on a blank pre-printed form or a form type of document containing fixed information and having blank fields where it is desired to provide variable information, extracted from a computer database, said method using a computer system and comprising a combination of the steps of;
    a) creating a first database containing tags wherein each tag is a record containing instructions the instructions being used to extract previously stored data from a second database;
    b) providing a means to display a scanned image of the form;
    c) providing a means to move a pointing device across the form image to locate the precise position of the blank field wherein a tag contained in the first database is inserted, the tag and its precise position on the blank field then being stored in a third database;
    d) providing a means during form filling of a pre-printed form located in an output device to sequentially access all the tags and their respective stored positions from the third database;
    e) providing a means to extract each tag, which has been accessed from the third database and the instructions associated with it from the first database;
    f) using said instructions to extract previously stored data from the second database and placing the extracted data at said precise position of the blank field on the pre-printed form.

2. The method as claimed in claim 1 wherein the instructions in the tag can be used to;
    a) access multiple databases to extract previously stored data;
    b) accept data as input from an input device contained in the computer system;
    c) reorganize said extracted data before placing the data on the form;
    d) access other tags;
    e) create arithmetic combination of tags;
    f) Place extracted data at the precise position of the blank field on the image of a pre-printed form displayed on a computer display device.

3. A method of extracting information from a pre-filled pre-printed form or a form type of document containing fixed information and having blank fields where it is desired to provide variable information, where the blank fields have been previously filled in manually, mechanically or electronically, said method using a computer system and comprising a combination of the steps of;
    a) creating a first database containing tags wherein each tag is a record containing instructions, the instructions being used to store or display extracted data;
    b) providing a means to display a scanned image of a blank pre-printed form;
    c) providing a means to move a pointing device across the form image to locate the precise position of the blank field, wherein a tag contained in the first database is entered;
    d) moving the pointing device to the end of the blank field, then vertically to a point just above the blank field thus defining a rectangle that would envelope the blank field;
    e) using said positions of the pointing device to determine the pixel coordinates of said rectangle that would envelope the blank field;
    f) moving the tag and the pixel co-ordinates of said rectangle for storage in a second database;
    g) providing a means to display a scanned image of a pre-printed form which has been pre-filled;
    h) providing a means, during extraction of information from a pre-filled form whose image is displayed on a computer display device, to sequentially access each tag and the respective co-ordinates of said rectangle stored in said second database;
    i) using the co-ordinates accessed from the second database to determine the display memory addresses of the rectangle now enveloping the image of the pre-filled information now located in the rectangle;
    j) providing a means to extract each tag which has been accessed from the second database and the instructions associated with it from the first database;
    k) using said instructions to move the image data contained in the rectangle for display or storage in a third database or for storage or display in another computer system.

* * * * *